United States Patent
Wubbels

(10) Patent No.: US 9,640,898 B1
(45) Date of Patent: May 2, 2017

(54) SYSTEM AND METHOD FOR EFFICIENT COUPLING OF CABLING IN A MULTI-CABLE RACK-MOUNTED ENVIRONMENT

(71) Applicant: NetSuite Inc., San Mateo, CA (US)

(72) Inventor: Kurt Alan Wubbels, San Jose, CA (US)

(73) Assignee: NetSuite Inc., San Mateo, CA (US)

(*) Notice: Subject to any disclaimer, the term of this patent is extended or adjusted under 35 U.S.C. 154(b) by 0 days.

(21) Appl. No.: 14/937,021

(22) Filed: Nov. 10, 2015

Related U.S. Application Data

(60) Provisional application No. 62/115,015, filed on Feb. 11, 2015.

(51) Int. Cl.
  *H01R 13/60* (2006.01)
  *H01R 13/518* (2006.01)
  *H01R 43/20* (2006.01)

(52) U.S. Cl.
  CPC .......... *H01R 13/518* (2013.01); *H01R 43/20* (2013.01)

(58) Field of Classification Search
  CPC   H01R 13/6272; H01R 13/518; H01R 13/743; H01R 23/025; H01R 9/24
  USPC ... 439/352, 354, 540.1, 557, 620.11, 620.17, 439/620.23, 676, 713
  See application file for complete search history.

(56) References Cited

U.S. PATENT DOCUMENTS

| | | | | |
|---|---|---|---|---|
| 4,972,298 A | * | 11/1990 | Casa | H05K 7/1424 361/679.32 |
| 5,836,786 A | * | 11/1998 | Pepe | H01R 13/518 439/540.1 |
| 6,086,415 A | * | 7/2000 | Sanchez | H01R 13/465 439/532 |
| 7,094,095 B1 | * | 8/2006 | Caveney | G02B 6/3897 385/134 |
| 7,112,090 B2 | * | 9/2006 | Caveney | H01R 13/518 439/540.1 |
| 7,179,119 B2 | * | 2/2007 | Follingstad | H01R 13/518 439/534 |
| 7,207,846 B2 | * | 4/2007 | Caveney | H01R 29/00 439/676 |
| 7,278,880 B1 | * | 10/2007 | Wu | H01R 13/518 439/540.1 |
| 7,367,850 B1 | * | 5/2008 | Chang | H01R 13/518 439/540.1 |

(Continued)

*Primary Examiner* — Thanh Tam Le
(74) *Attorney, Agent, or Firm* — Lane Powell PC

(57) ABSTRACT

Systems, apparatuses, and methods for efficiently decoupling and recoupling various groupings of computer-network cabling in computer network environments using one or more multi-port, rapid-connect brackets. A multi-port, rapid-connect bracket may include individual interfaces for patch cables to be seated for coupling to a network device. The rapid-connect bracket may further include one or more actuating arms for maneuvering several connectors at once in order to release each individual connector from a seated engagement with the network device. In this manner, the entire rapid connect bracket is removed from being engaged with the device while the individual patch cables remain seated in the bracket itself. Once removed from the network device, the bracket maintains the position of each patch cable such that the bracket may be recoupled to a new network device.

18 Claims, 6 Drawing Sheets

(56) References Cited

U.S. PATENT DOCUMENTS

| | | | | |
|---|---|---|---|---|
| 7,927,107 B2* | 4/2011 | Peng | .................... | H01R 13/506 |
| | | | | 439/49 |
| 8,382,515 B2* | 2/2013 | Caveney | .............. | H01R 13/518 |
| | | | | 439/532 |
| 8,747,150 B1* | 6/2014 | Lin | .......................... | H04Q 1/13 |
| | | | | 439/540.1 |
| 8,834,199 B2* | 9/2014 | Foung | .................. | H01R 13/518 |
| | | | | 439/540.1 |
| 9,326,418 B2* | 4/2016 | Knight | ................... | H05K 7/186 |

\* cited by examiner

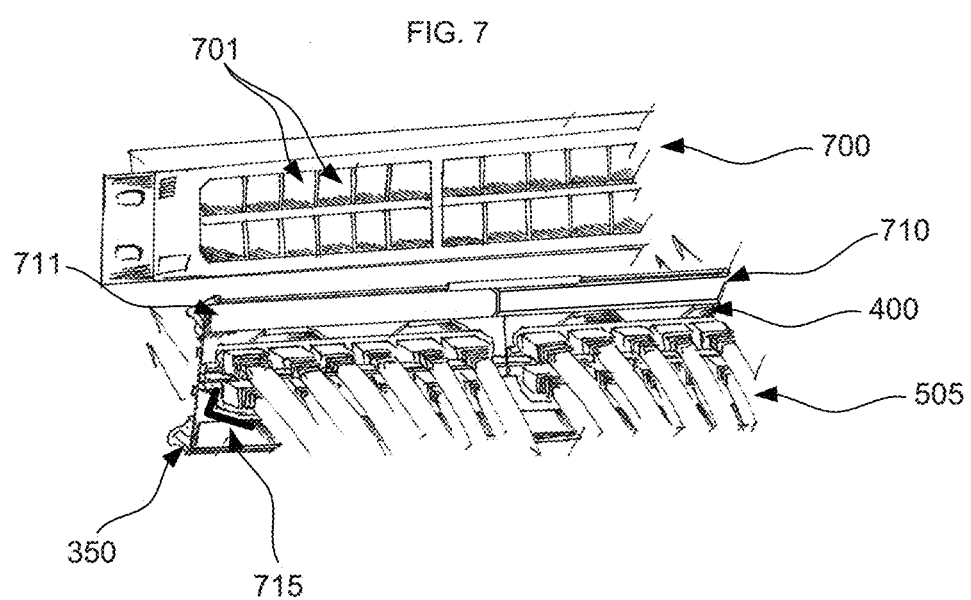

US 9,640,898 B1

SYSTEM AND METHOD FOR EFFICIENT COUPLING OF CABLING IN A MULTI-CABLE RACK-MOUNTED ENVIRONMENT

PRIORITY CLAIM

This application claims the benefit of U.S. Provisional Application No. 62/115,015, entitled "System and Method for Efficient Coupling of Cabling in a Multi-Cable Rack-Mounted Environment," filed Feb. 11, 2015, which is incorporated by reference in its entirety herein for all purposes.

BACKGROUND

Modern networked computing environments may typically feature rack-mounted server computers, hubs, routers, and switches for providing network coupling interfaces for several different computing devices. For example, it is common for large local area networks to utilize 48-port switches for connecting several computing devices to a local network at one common rack-mounted device. As a result, communicative cabling may be routed and terminated near each network device. With a great number of cables (e.g., Cat-5 or Cat-6 cabling) all terminating in one location, organization and cabling structure becomes important.

One solution implemented in the past includes using patch bays wherein each lengthy cable run is terminated at a patch bay and carefully numbered and recorded in network drawings. Then, a shorter patch cable (such as 3-6 feet in length) may then be used to couple from the patch bay to the network device. This convention eliminates some wear-and-tear on the long cable runs by interjecting a patch bay for receiving the brunt of coupling-uncoupling-recoupling activity. However, if the patch bay or the network device is to be replaced (due to failure or obsolescence), a technician must painstakingly remove each short-run patch cable and carefully reassemble the order of the patch cables at the new patch bay or device. That is, each individual patch cable must be carefully replaced one-by-one once the new piece of equipment is in place in order to ensure that the corresponding computing device at the other end of the lengthy cabling run is patched back to the same position in the network. Such individual cable re-patching is time-consuming, cumbersome, and prone to human error.

BRIEF DESCRIPTION OF THE DRAWINGS

Embodiments of the subject matter in accordance with the present disclosure will be described with reference to the drawings, in which:

FIG. 7 is an isometric view of a cable coupling bracket having a port mounting card in the midst of engaging with a rack-mounted device according to an embodiment of the subject matter disclosed herein.

Note that the same numbers are used throughout the disclosure and figures to reference like components and features.

DETAILED DESCRIPTION

Figure 1:
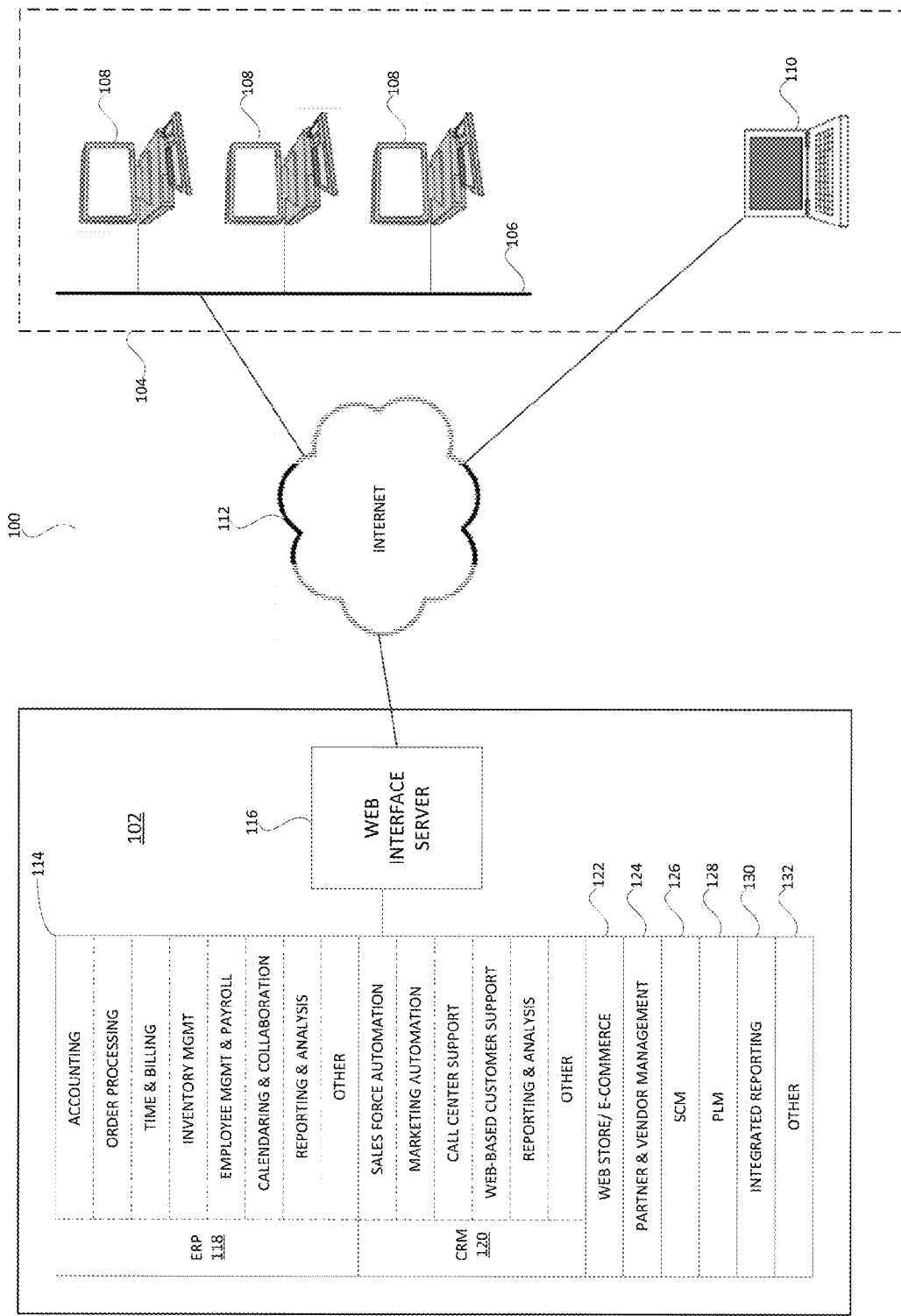
FIG. 1 is a diagram illustrating a system, including an integrated business system and an enterprise network in which an embodiment of the subject matter may be implemented.

The subject matter of embodiments of the disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the disclosure will be described more fully hereinafter with reference to the accompanying drawings, which form a part hereof, and which show, by way of illustration, exemplary embodiments by which the subject matter may be practiced. This subject matter may, however, be embodied in many different forms and should not be construed as limited to the embodiments set forth herein; rather, these embodiments are provided so that this disclosure will satisfy the statutory requirements and convey the scope of the subject matter to those skilled in the art.

Embodiments are directed to systems, apparatuses, and methods for efficiently decoupling and recoupling various groupings of computer-network cabling in computer network environments using one or more multi-port, rapid-connect brackets. A multi-port, rapid-connect bracket may include individual interfaces for patch cables to be seated for coupling to a network device. The total number of cables that can be used can be any number and may typically be 12, 24, or 48 as these are standard numbers of ports is conventional networking devices. The rapid-connect bracket may further include one or more actuating arms for maneuvering several connectors at once in order to release each individual connector from a seated engagement with the network device. In this manner, the entire rapid connect bracket is removed from being engaged with the device while the individual patch cables remain seated in the bracket itself. Once removed from the network device, the bracket maintains the position of each patch cable such that the bracket may be recoupled to a new network device, such as a replacement device taking the place of a failed or obsolete device having the same number of ports.

There are a number of best practices that datacenter engineers employ to help streamline a process for replacing high port-density network devices. For example, top of rack patch panels with short run cables, cable labeling, adjacent spares and the like, are helpful, but none of which prevent the possibility of human error or save significant time in replacement of a failed device. Generally concerns about inability to triage device level failures are addressed with redundant systems. Failures in these systems do not cause immediate outages, but in replacing a failed component, the risk of human error persists and outages often occur when a replaced system is added back into a redundant configuration or when the secondary network device fails and it's discovered the spare system has been misconfigured. A device-specific, patch cable bracket according to embodiments disclosed herein alleviate the time-consuming, cumbersome, and human-error prone aspects of device replacement. Other objects and advantages of the present disclosure will be apparent to one of ordinary skill in the art upon review of the detailed description of the present subject matter and the included figures. Prior to discussing the figures related to the embodiments of a multi-port rapid-connect bracket (FIGS. 3-7), an overview of a multi-tenant computing environment is discussed with respect to FIGS. 1-2a-2b.

FIGS. 1-2a-2b show computers systems and computer modules in various configurations that work together to provide an overall networked computing environment such that various enterprise wide software solutions may be provided across a multi-tenant computing network. Among other things, the present subject matter may be embodied in whole or in part as a system, as one or more methods, or as one or more devices. Embodiments may take the form of a hardware implemented embodiment. The following detailed description is, therefore, not to be taken in a limiting sense.

As noted, in some embodiments, the subject matter may be implemented in the context of a multi-tenant, "cloud" based computing environment (such as a multi-tenant business data processing platform), typically used to develop and provide web services and business applications for end users. Such a computing environment may include a large number of centrally-located server computers, network hubs, network switches, and network routers that interconnected with each other in a hierarchical manner via patch cabling and routing. As businesses and customers rely on uptime for all computing components, it becomes important to minimize downtime when repairs or replacements are made. The devices and methods described below with respect to FIGS. 3-7 make repairs and replacements more efficient in such a computing environment.

This exemplary implementation environment will be described with reference to FIGS. 1-2a-2b. Note that embodiments may also be implemented in the context of other computing or operational environments or systems, such as for an individual business data processing system, a private network used with a plurality of client terminals, a remote or on-site data processing system, another form of client-server architecture, and the like.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless Internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, and the like, with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, and the like. A web server is a most often a combination of hardware and the software that helps deliver content, commonly by hosting a website, to client web browsers that access the web server via the Internet.

Figure 2A:
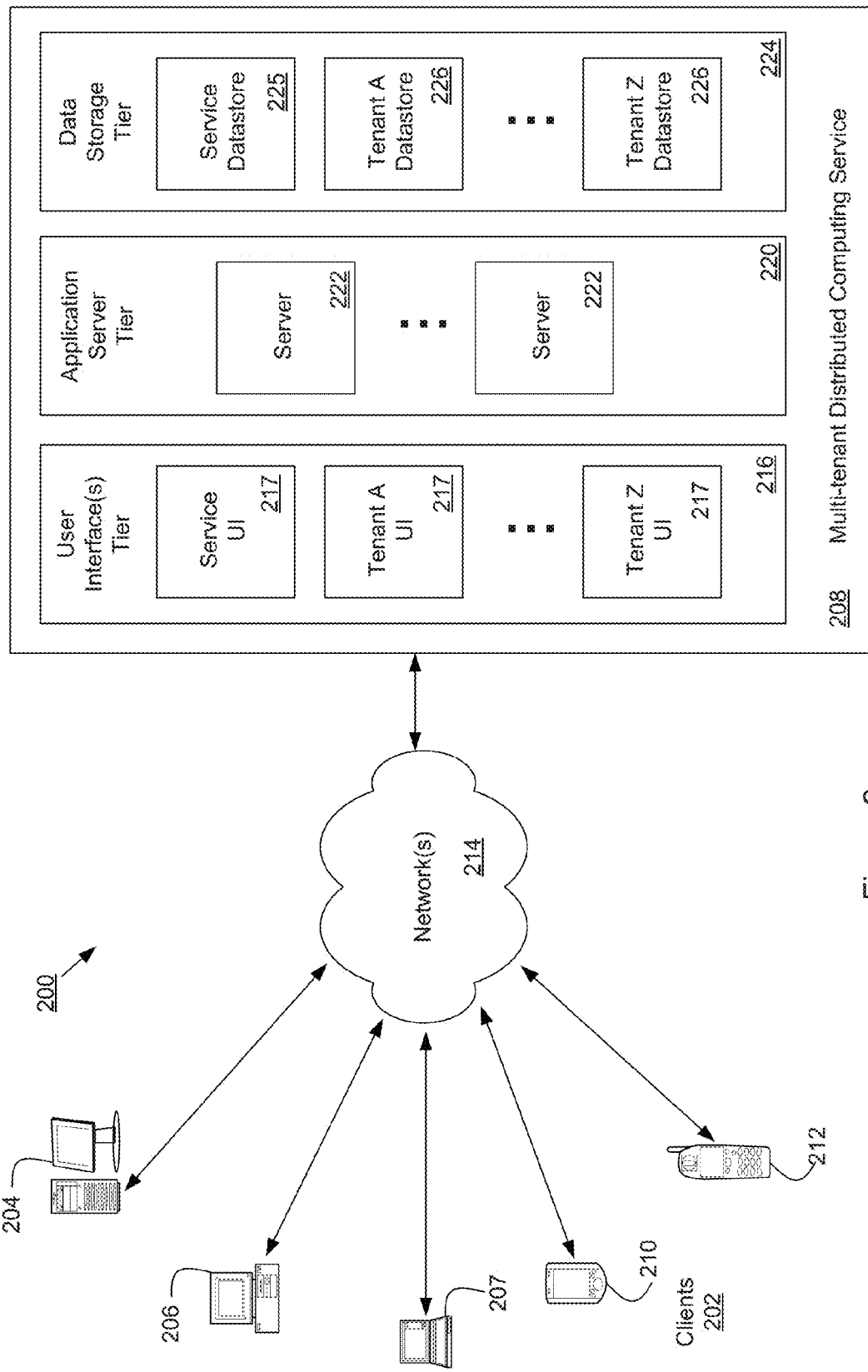
FIG. 2a is a diagram illustrating elements or components of an example operating environment in which an embodiment of the subject matter may be implemented.

FIG. 2a is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figures), as well as one or more user interfaces that have been specialized/customized in accordance with user specific requirements (e.g., represented by "Tenant A UI", . . . , "Tenant Z UI" in the figures, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figures may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, and the like. Data stores may be implemented with any suitable data storage technology, including structured query language (SQL) based relational database management systems (RDBMS).

In accordance with one embodiment, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2a) may also include one or more of an integrated partner and vendor management system, eCommerce system (e.g., a virtual storefront application or platform), product lifecycle management (PLM) system, Human Resources management system (which may include medical/dental insurance administration, payroll, and the like), or supply chain management (SCM) system Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2a).

As noted with regards to FIG. 1, the integrated business system shown in FIG. 2a may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or and customers. In some cases such an extension may be applied to the processing of the tenant's business related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases the developer may prefer to make the upgrade available to only a select set of users (at least initially) in order to obtain feedback for improving the newer version of the extension; to test the stability of the extension, or to assist them to segment the market for their extension(s).

Figure 2B:
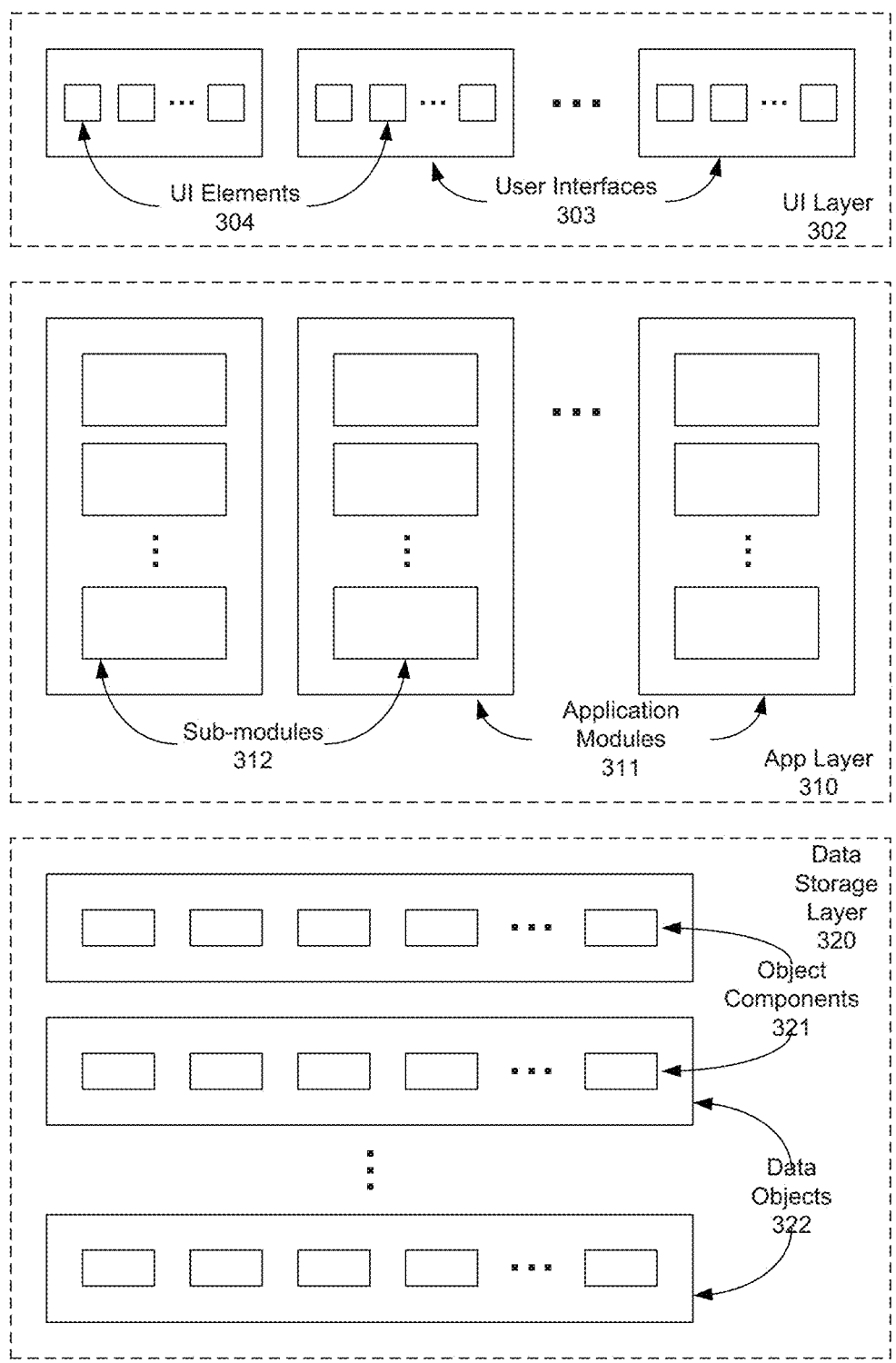
FIG. 2b is a diagram illustrating additional details of the elements or components of the multi-tenant distributed computing service platform of FIG. 2a, in which an embodiment of the subject matter may be implemented.

FIG. 2b is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be used in conjunction with any set of software instructions that are designed to be executed by a suitably programmed processing element (such as a CPU; microprocessor, processor, controller, computing device, and the like). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 2b is a diagram illustrating additional details of the elements or components 300 of the multi-tenant distributed computing service platform of FIG. 2a, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example; users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols. As described herein, embodiments of the invention provide a method for configuring aspects of a user interface (such as the data entry fields of a form) by specifying one or more user interface elements to present to a specified user.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2a) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-2a-2b are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user. Although further examples below may reference the example computing environment depicted in FIGS. 1-2a-2b, it will be apparent to one of skill in the art that the examples may be adapted for alternate computing devices, systems, apparatuses, processes, and environments.

Attention is now turned to FIGS. 3-7 to discuss aspects of various embodiments of a multi-port, rapid-connect bracket.

Figure 3:
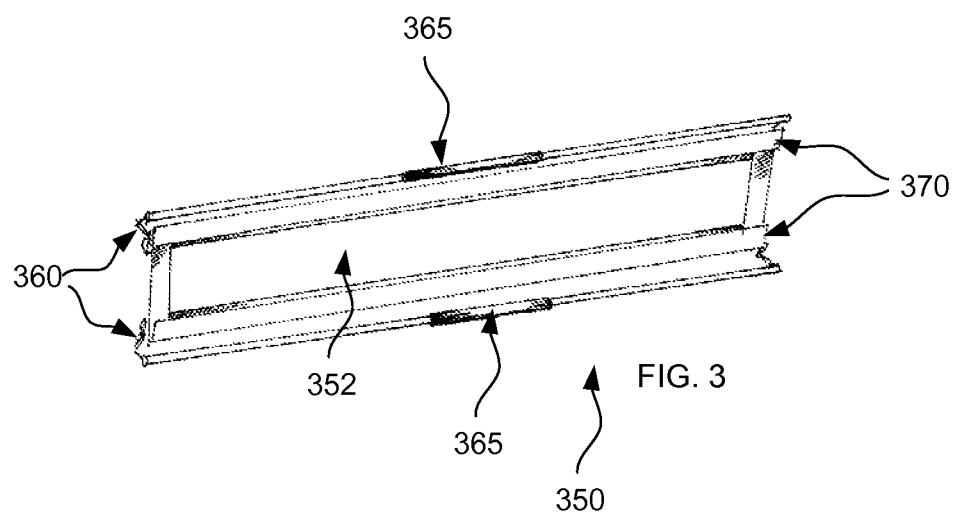
FIG. 3 is an isometric view of a cable coupling bracket according to an embodiment of the subject matter disclosed herein.

FIG. 3 is an isometric view of a cable coupling bracket 350 according to an embodiment of the subject matter disclosed herein. The example computing environment of FIGS. 1-2a-2b employ various networking devices and network topologies that use patch cabling between network devices, hubs, and server computing elements. As discussed in the background, a network administrator or other technician may often be called upon to swap one or more networking devices having multiple cable connections and patch points between the various computing devices, hubs, and server computing elements. Patch cables for computing networking environments often comply with various cabling standards such as RJ-45 or RJ-38 using conventional Ethernet (Cat-5e or Cat-6, for example) or telephony wiring terminations. Further, these registered jack (RJ) configurations typically include a biased arm (not shown in FIG. 3) that latches the jack into a receptacle when engaged. As is well known in the art, the biased arm may be depressed to release the jack from the receptacle while the cable is pulled from the receptacle. As such, the biased arm is typically actuated by a human hand when engaging or disengaging the patch cable from the jack. Embodiments of a system and method for more efficient cable coupling begins with the cable coupling bracket 350 as shown in FIG. 3.

The cable coupling bracket 350 of FIG. 3 may be made from plastic or metal or other suitable material and shows an empty main frame area 352 so as to more easily show top and bottom frame disconnect levers 360. As will become more clear in figures described below, the disconnect levers 360 may be actuated to simultaneously disengage all patch cable jacks (not shown) in the top or bottom rows. The disconnect levers 360 may be tailored to specifically fit a contour of network device (not shown) to which is may be attached. Further, the top and bottom disconnect levers 360 may further include bar grips 365 to more easily handle the thin disconnect levers 360. Further yet, the cable coupling bracket 350 may include guide tracks 370 for slidably engaging a port mounting card (not shown). The port mounting card is discussed next with respect to FIG. 4.

Figure 4:
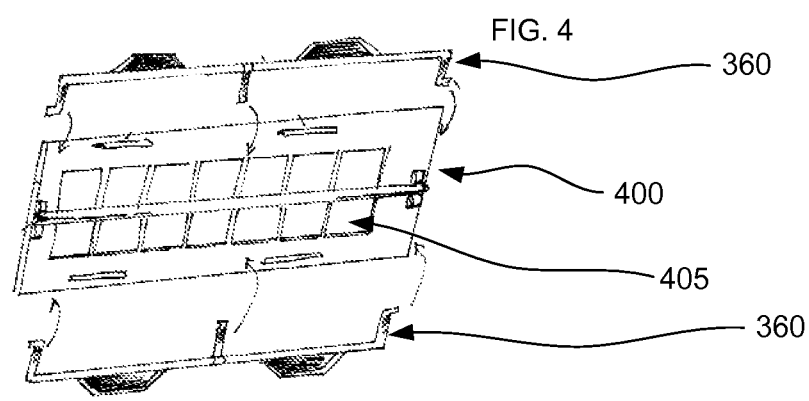
FIG. 4 is an isometric view of a port mounting card according to an embodiment of the subject matter disclosed herein.

FIG. 4 is an isometric view of a port mounting card 400 according to an embodiment of the subject matter disclosed herein. This embodiment of a port mounting card 400 may be made from plastic or metal or other suitable material and may be slidably engaged with the cable coupling bracket 350 as shown in FIG. 3. That is, the top and bottom edges of the port mounting card 400 may be configured to slide in from the side and engage the track guides 370 of the cable coupling bracket 350 as shown in FIG. 3. FIG. 4 shows the disconnect levers 360 that are part of the cable coupling bracket 350 of FIG. 3 although, for simplicity sake, the cable coupling bracket 350 is now shown in FIG. 4. Further, curved arrows in FIG. 4 indicate how the disconnect levers 360 may be rotated downward to engage cable jack release arms (although none are shown in this figure).

The embodiment of FIG. 4 shows port spaces 405 for 14 patch cable jacks (not shown). The configuration of the port spaces 405 as well as the location of the disconnect levers 360 may be tailored to match specific network devices from various manufacturers. As patch cable jacks are typically installed in each port space 405, the disconnect levers 360 may be rotated down to secure the entire row (either top or bottom in this example) of patch cables into a respective underlying network device (not shown). Further, each individual patch cable may be held in place in the port mounting card 400 by individual cable retaining clips (not shown in FIG. 4). Then, when being replaced (in presumably a new underlying network device) each patch cable remains affixed to a respective port space 405 so as to maintain position and ordering during maintenance. Such a configuration is shown in FIG. 5.

Figure 5:
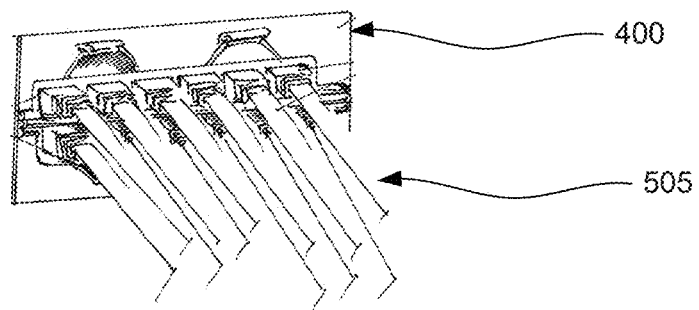
FIG. 5 is an isometric view of a port mounting card having engaged patch cables according to an embodiment of the subject matter disclosed herein.

FIG. 5 is an isometric view of a port mounting card 400 having several patch cables 505 engaged therewith according to an embodiment of the subject matter disclosed herein. In this embodiment, a top row of six patch cables 505 and a bottom row of six patch cables 505 are securably engaged with a port mounting card 400. Thus, the fully stocked port mounting card 400 may be ready to be slidably engaged with a cable coupling bracket 350 as shown next with respect to FIG. 6.

Figure 6:
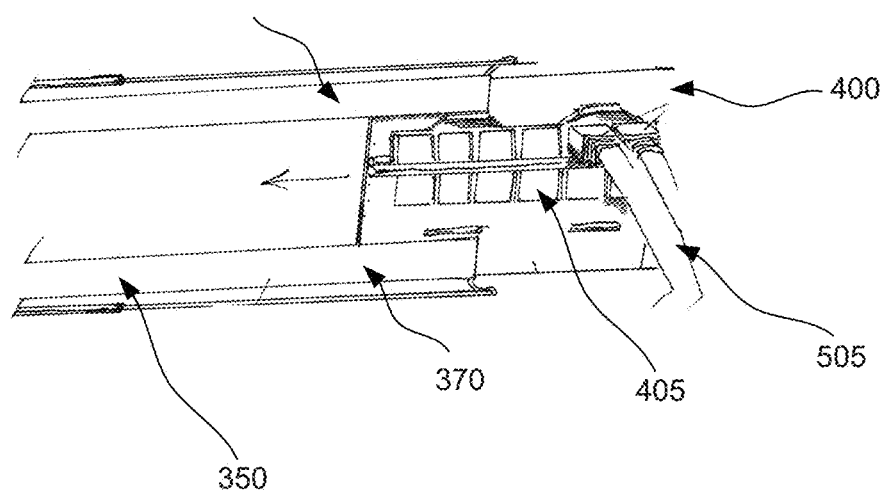
FIG. 6 is an isometric view of a cable coupling bracket in the midst of engaging with a port mounting card according to an embodiment of the subject matter disclosed herein.

FIG. 6 is an isometric view of a cable coupling bracket 350 in the midst of engaging with a port mounting card 400 according to an embodiment of the subject matter disclosed herein. In this embodiment, the port mounting card 400 is shown with two cables 505 mounted and engaged with two of the port spaces 405 in the port mounting card 400. The port mounting card 400 is in the midst of being slid into the guide tracks 370 of cable coupling bracket 350. As can be seen, edges of the port mounting card 400 are slid into guide tracks 370 so as to secure the cable coupling bracket 350 within the port mounting card 400. The combination of the cable coupling bracket 350 within the port mounting card 400 may then be attached to a network device as shown in FIG. 7.

FIG. 7 is an isometric view of a cable coupling bracket 350 having a port mounting card 400 in the midst of engaging with a network device 700 according to an embodiment of the subject matter disclosed herein. Here, the network device 700 is a rack-mounted device that may be a conventional network switch or other similar networking device. In other embodiments, the network device 700 need not be a rack-mounted device. As the cable coupling bracket 350 is moved toward a network device 700, each patch cable 505 may be secured in place in a respective port space 405 to be aligned with a corresponding network device port 701. When ready to engage the network device 700, disconnect levers 360 may be rotated away from the cable coupling bracket 350 to a position such that each patch cable jack is ready to engage a respective network device port 701. Thus, each installed patch cable jack mates with a respective network device port 701 to secure the cable coupling bracket 350 to the network device 700. Then, at a later time, a technician may rotate the disconnect levers 360 to a second position to disengage each patch cable jack simultaneously from each network device port 701 and pull the cable coupling bracket 350 away from the network device 700, but while still maintaining the patch cables 505 secured to the port mounting card 400 so as to retain the order in which the cables 505 themselves are aligned with respect to the network device ports 701. In some embodiments, the disconnect levers 360 are used to secure the main frame to a front of a network device 700 without use of conventional biased clipping arms on individual jacks.

In another embodiment, the cable coupling bracket 350 may comprise first 710 and second 711 portions that are slidably engaged with each other in a manner to allow the overall length of the cable coupling bracket 350 to be adjusted to fit the size of a network device 700. That is, the first portion 710 includes a contoured edge that matches a contoured reciprocal edge of the second portion such that the two portions 710 and 711 may slidably move towards or away from each other as desired while still anchoring one or more port mounting cards 400. In FIG. 7, this embodiment shows two port mounting cards 400 having two rows of six port holes. In other embodiments, the port mounting cards may include any number of port holes including two, four, six, eight, and other numbers of port holes. Thus, as the cable coupling bracket 350 is adjusted to fit the length of a network device, the appropriate number of port holes in a configuration of one or more port mounting cards 400 can be deployed.

In further embodiments, each patch cable 505 may be secured to each respective port hole of the port mounting cards 400 by using a cable retaining clip 715. In FIG. 7, the referenced cable retaining clip 715 is emphasized in the illustrated example. The cable retaining clip 715 may be any mechanism suited to hold a patch cable to a port hole of a port mounting card 400.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the subject matter and does not pose a limitation to the scope of the subject matter unless otherwise claimed. No language in the specification should be construed as indicating any non-claimed element as essential to each embodiment of the present subject matter.

Different arrangements of the components depicted in the drawings or described above, as well as components and steps not shown or described are possible. Similarly, some features and sub-combinations are useful and may be employed without reference to other features and sub-combinations. Embodiments of the subject matter have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. An apparatus, comprising:
   a connector card having at least one port hole surrounded by a rigid frame member, the connector card configured to guide at least one patch cable jack to the at least one port hole;
   a bracket configured to removably engage the connector card and configured to removably engage a device having at least one port; and
   at least one retaining lever coupled to the bracket and configured to be maneuvered in a first manner to manipulate the at least one patch cable jack to engage the at least one port and to securely hold the bracket to the device and configured to be maneuvered in a second manner to release the at least one patch cable jack from the at least one port and pull the bracket away from the device.

2. The apparatus of claim 1, wherein the connector card further comprises a plurality of port holes, each port hole is configured to guide a respective patch cable jack having an RJ-45 connector to a respective port suited for receiving an RJ-45 connector.

3. The apparatus of claim 1, wherein the at least one retaining lever is further configured to be rotated into a release position and rotated away from the release position.

4. The apparatus of claim 1, further comprising a plurality of cable retaining clips disposed on the connector card and configured for maneuvering to secure and release a respective patch cable jack to the connector card.

5. The apparatus of claim 1, wherein the connector card is configured to slidably engage the bracket.

6. The apparatus of claim 1, wherein the connector card further comprises a top row of twelve port holes and a bottom row of twelve port holes.

7. The apparatus of claim 1, wherein the bracket further comprises a first portion slidably engaged with a second portion such that a length of the bracket may be adjusted by sliding the first portion with respect to the second portion.

8. The apparatus of claim 1, further comprising a plurality of connector cards slidably engaged with the bracket.

9. The apparatus of claim 1, further comprising a first retaining lever configured for maneuvering to release a top row of patch cable jacks and a second retaining lever configured for maneuvering to release a bottom row of patch cable jacks.

10. A system, comprising:
    a computer networking device having at least one communication port;
    a connector card having at least one port hole surrounded by a rigid frame member, the connector card configured to guide at least one patch cable jack to the at least one port hole;
    a bracket configured to removably engage the connector card and configured to removably engage the computer networking device; and
    at least one retaining lever coupled to the bracket and configured to be maneuvered in a first manner to manipulate the at least one patch cable jack to engage the at least one communication port and to securely hold the bracket to the computer networking device and configured to be maneuvered in a second manner to release the at least one patch cable jack from the at least one communication port and pull the bracket away from the computer networking device.

11. The system of claim 10, wherein the communication port further comprises an Ethernet port.

12. The system of claim 10, wherein the at least one retaining lever is further configured to be rotated into a release position and rotated away from the release position.

13. The system of claim 10, further comprising a first retaining lever configured for maneuvering to release a top row of patch cable jacks and a second retaining lever configured for maneuvering to release a bottom row of patch cable jacks.

14. The system of claim 10, wherein the computer network device further comprises a top row of twelve communication ports and a bottom row of twelve communication ports.

15. The system of claim 10, wherein the at least one retaining lever further comprises a biased member configured to bias the retaining lever away from the maneuver to release.

16. The system of claim 10, wherein the bracket further comprises a first portion slidably engaged with a second portion such that a length of the bracket may be adjusted by sliding the first portion with respect to the second portion.

17. A method, comprising:
    securing a plurality of patch cable jacks to a connector card having a plurality of port holes;
    slidably engaging a bracket contoured to secure the connector card; and
    engaging each of the patch cable jacks with a respective communication port of a network device;
    wherein the securing the plurality of patch cable jacks to the connector card further comprises actuating a cable retaining clip at a respective port hole of the connector card for each secured patch cable jack;
    rotating a disconnect lever coupled to the bracket to disengage at least some of the patch cable jacks from the network device.

18. The method of claim 17, further comprising rotating a top-side disconnect lever coupled to the bracket to disengage corresponding top-side patch cable jacks from the network device and rotating a bottom-side disconnect lever coupled to the bracket to disengage corresponding bottom-side patch cable jacks from the network device.

* * * * *